United States Patent

[11] 3,608,686

| [72] | Inventors | Thomas B. Martin, Sr. 182 Cross Road, Danville, Calif. 94526; Thomas B. Martin, Jr., 17 Dudley Court, Pleasant Hill, Calif. 94523 |
|---|---|---|
| [21] | Appl. No. | 886,160 |
| [22] | Filed | Dec. 18, 1969 |
| [45] | Patented | Sept. 28, 1971 |

[54] AUTOMATIC RELEASE CLUTCH
7 Claims, 5 Drawing Figs.

[52] U.S. Cl. .................................................. 192/150, 64/29
[51] Int. Cl. .............................................. F16d 43/20, F16d 7/00
[50] Field of Search ............................................ 192/56 R, 150; 64/29; 308/DIG. 7

[56] References Cited
UNITED STATES PATENTS

| 1,883,164 | 10/1932 | Vassakos | 64/29 X |
| 2,209,155 | 7/1940 | Fagg | 192/150 |
| 2,497,893 | 2/1950 | Linahan | 192/56 |
| 3,143,758 | 8/1964 | Dunham | 308/DIG. 7 |
| 3,167,936 | 2/1965 | Engquist | 64/29 |

Primary Examiner—Allan D. Herrmann
Attorney—Julian Caplan

ABSTRACT: To prevent damage to automatic machine tools wherein a motor is connected to a rotating machine tool part a clutch is interposed which opens by axial movement when the load of springs is exceeded. Axial movement of a clutch element causes a switch to open, thereby deenergizing the motor. The clutch drive comprises two facing disks having holes to receive resilient balls which normally function as keys. When the clutch is overloaded, the disks move apart, permitting the bills to leave the holes and ride in grooves in the disk faces.

PATENTED SEP 28 1971
3,608,686
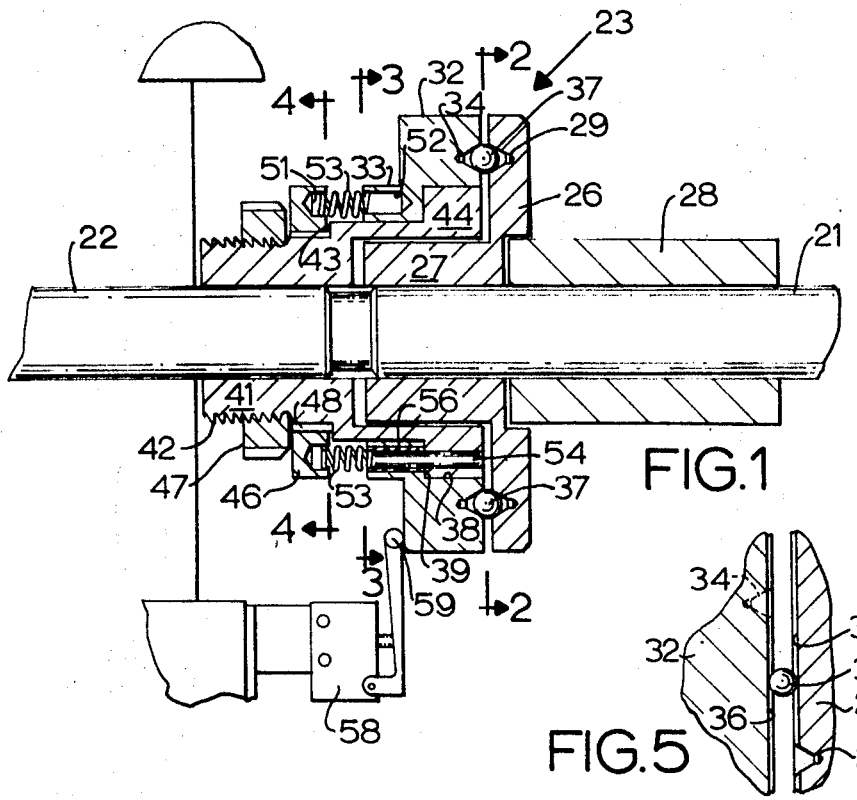
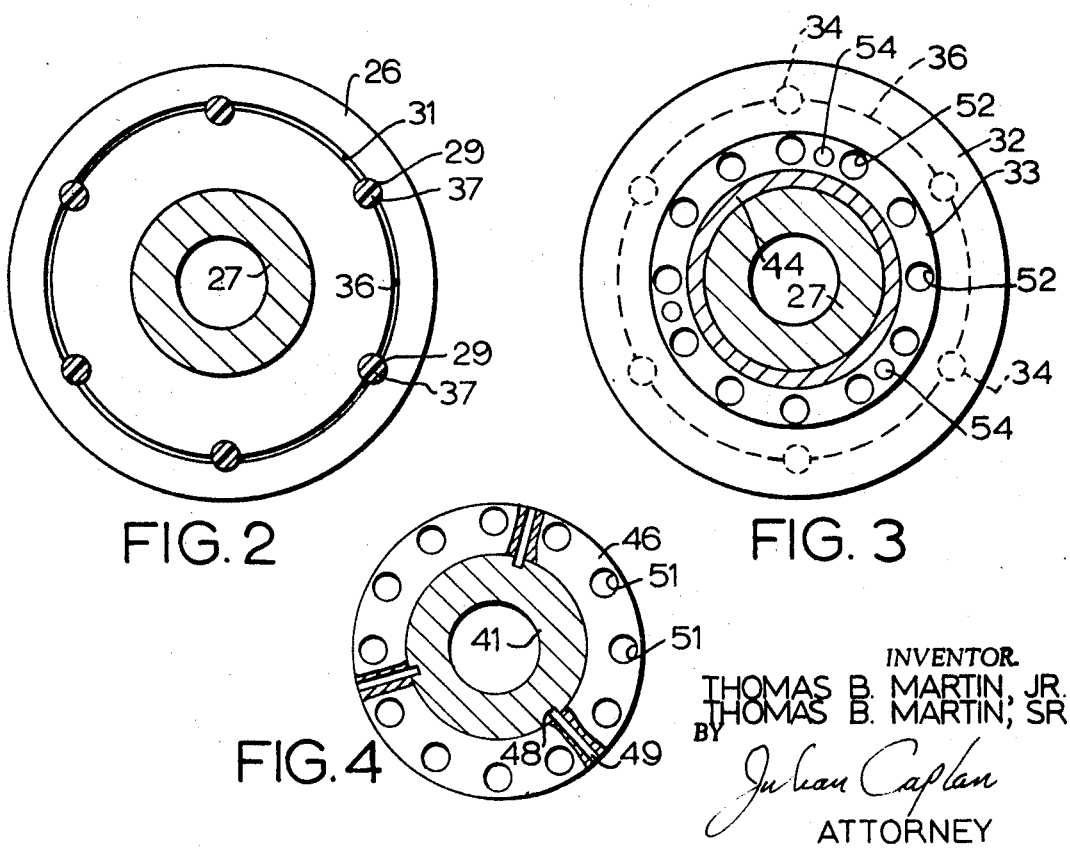
INVENTOR.
THOMAS B. MARTIN, JR.
THOMAS B. MARTIN, SR.
BY
Julian Caplan
ATTORNEY

AUTOMATIC RELEASE CLUTCH

This invention relates to a new and improved automatic release clutch. More particularly the invention relates to a clutch interposed between a motor shaft and a rotary driven element of a machine tool or the like which opens to disengage the two shafts when a preselected load is exceeded. The opening of the clutch causes axial movement of one of the clutch elements and this in turn causes a microswitch to be thrown and in turn deenergizes the motor.

A particular feature and advantage of the invention is the fact that the operating elements of the clutch are keyed together by resilient balls seating in holes in opposed disks, one of the disks being movable toward and away from the other. Springs bias the disks toward each other and cause the balls to seat in the opposed holes. When the force of the springs is exceeded, the disks move apart and the balls are unseated. Accordingly, the present invention provides a safe, direct operating mechanism which prevents damage to fragile machine elements especially where very heavy drive motors are used.

Another feature of the invention is the fact that the pressure which is imposed by the springs may be varied by readily replacing the springs by other springs of different characteristics or by adjusting the amount of compression which is imposed on the spring.

Another feature and advantage of the invention is the fact that when the clutch is overloaded and the condition which has caused the overload has been remedied, the clutch may be reengaged with a minimum of time and effort required.

Another feature of the invention is the substantially frictionless operation of the clutch, making it extremely accurate. The rolling contact of the resilient balls reduces friction to a minimum.

The resilient balls absorb the shock of rotational vibratory motion even of the type produced by "stepping" electric motors, frequently used to drive machine with which this invention is used. Use of nonresilient balls might tend to destroy the mechanism. Other objects of the present invention will become apparent upon reading the following specification and referring to the accompanying drawings in which similar characters of reference represent corresponding parts in each of the several views.

In the drawings:

FIG. 1 is vertical sectional view through the clutch and associated element.

FIGS. 2 to 4 inclusive are transverse sectional views taken along the lines 2—2, 3—3, and 4—4, respectively, of FIG. 1.

FIG. 5 is an enlarged fragmentary sectional view showing the disks of the clutch separated so that the ball which normally keys the two disks together is disengaged.

The present invention is interposed between a drive shaft 21 which is connected to a powerful motor such as a hydraulic motor and a driven shaft 22 which may be a screw of a milling machine or the like. The clutch designated generally by reference numeral 23 operatively connects the shaft 21 and shaft 22 together under normal conditions. However, when an abnormal condition occurs such as might cause breakage of a tool or the machine elements, the clutch 23 disengages. More importantly, as hereinafter explained, the disengagement of the clutch causes a microswitch to be thrown which, through various relays, causes the pump which drives the motor shaft 21 to be deenergized.

Clutch 23 has a drive disk 26 (sometimes herein referred to as the "first flange") having a hub 27 surrounding and keyed to shaft 21 and backed by a backing sleeve 28 which prevents movement of disk 26 to the right as viewed in FIG. 1. In one face of disk 26 six preferably conical holes 29 are formed, preferably equiangularly spaced. Interconnecting the holes 29 is a shallow groove 31 formed in the face of disk 26.

Facing disk 26 is a driven disk (sometimes herein referred to as the "second flange") which is annular and has a hub 33. Disk 32 is formed with holes 34 which match holes 29 and groove 36 interconnects said holes 34. Resilient balls 37 of neoprene or the like are normally seated both in holes 29 and 34 as is shown in FIG. 1. When thus seated, the balls function as keys which cause disks 26 and 32 and, as hereinafter explained, shafts 21 and 22 to revolve together. When disk 32 moves to the left of the position shown in FIG. 1 and assumes the position shown in FIG. 5, the balls 37 are unseated from holes 29 or 34 or both and are captured against escape in the grooves 31 and 36. Disk 32 is formed with a counterbore 38, the bottom of which provides a shoulder 39.

Fitting 41 (sometimes herein referred to as the "inner member") is keyed to shaft 22. Remote from disk 32 is an externally threaded end 42 which terminates in a shoulder 43. Beyond shoulder 43 is a flange 44 which fits into the counterbore 38 and nests against shoulder 39. Fitting over end 41 and against shoulder 43 is an annular collar 46 (sometimes herein referred to as the "spring support means") which is held in place by a nut 47 on threaded end 42. By adjustment of nut 47 the position of collar 46 may be controlled. Keyways 48 are formed in end 41 and a series of pins 49 (here shown as three in number) extend through collar 46 and into the keyways 48, thereby causing the element 46 to rotate with fitting 41 but permitting axial-sliding movement thereof as controlled by nut 47.

A series of equiangularly spaced holes 51 is formed in collar 46. Matching holes 52 are formed in hub 33 of disk 32. Extending into both holes 51 and 52 are springs 53 which function to bias disk 32 toward disk 26. Pins 54 parallel to the axes of shafts 21 and 22 extend through holes in hub 33 and flange 44 of fitting 41. Bushings 56 in hub 33 insure that member 32 may slide axially relative to member 41.

Mounted on the machine is a microswitch 58 the roller 59 of which rides on the back side of driven disk 32. Accordingly, when the disk 32 is moved to the left of the position shown in FIG. 1, roller 59 causes switch 58 to be thrown and through a series of relays the electric motor driving the pump which in turn drives the motor for shaft 21 is deenergized, causing the machine to stop.

In use of the device, normally balls 37 seat in holes 29 and 34. Springs 53 are selected and nut 47 is adjusted in position along threaded end 42 so that the disks 32 and 26 will be in the position of FIG. 1 during normal operation. However, if something should cause the shaft 22 to be held against rotation, the balls 37 will leave the holes 29 and 34 and ride into the grooves 31 and 36 and the disk 32 will be moved to the left against the force of springs 53. Thereupon switch 58 functions to stop the motor and also to sound any alarm that is desired.

Although the foregoing invention has been described in some detail, by way of illustration and example for purposes of clarity of understanding, it is understood that certain changes and modifications may be practiced within the spirit of the invention and scope of the appended claims.

What is claimed is:

1. A clutch of the character described comprising a first member having means for connection to a first shaft and a first flange, said first flange formed with a plurality of arcuately spaced first holes on its inner surface, an annular second flange opposed to said first flange and formed on its opposed surface with second holes opposite said first holes, an inner member having means for connection to a second shaft aligned with said first shaft and carrying spring support means, said second flange supported by and axially slidable relative to said inner member, spring means interposed between said second flange and said spring support means biasing said second flange toward said first flange, a plurality of resilient balls normally seated in said first and second holes to key said flanges for rotation together, and means for causing said inner member and said second flange to rotate together, said second flange axially movable relative to said first flange upon overload of said clutch to unseat said balls from said holes.

2. A clutch according to claim 1 which further comprises a microswitch engaging said second flange and operable upon axial unseating movement of said second flange to render drive means for one of said shafts inoperable.

3. A clutch according to claim 1 in which at least one said flange is formed with a shallow annular groove intersecting one of said sets of holes, whereby balls unseated from said holes upon movement of said second flange away from said first flange are retained within said groove.

4. A clutch according to claim 1 in which said inner member is formed with means limiting movement of said second flange toward said first flange.

5. A clutch according to claim 1 in which said spring support means comprises a separable ring rotatable with said inner member formed with a plurality of sockets receiving said spring means.

6. A clutch according to claim 5 in which said spring support means is movable toward and away from said second flange to adjust the pressure of said spring means.

7. A clutch according to claim 6 which further comprises adjustment means adjusting the position of said support means.